July 5, 1932.                N. KRAWITZ                1,865,923
                            DISPLAY DEVICE
              Filed Nov. 3, 1928           3 Sheets-Sheet 1
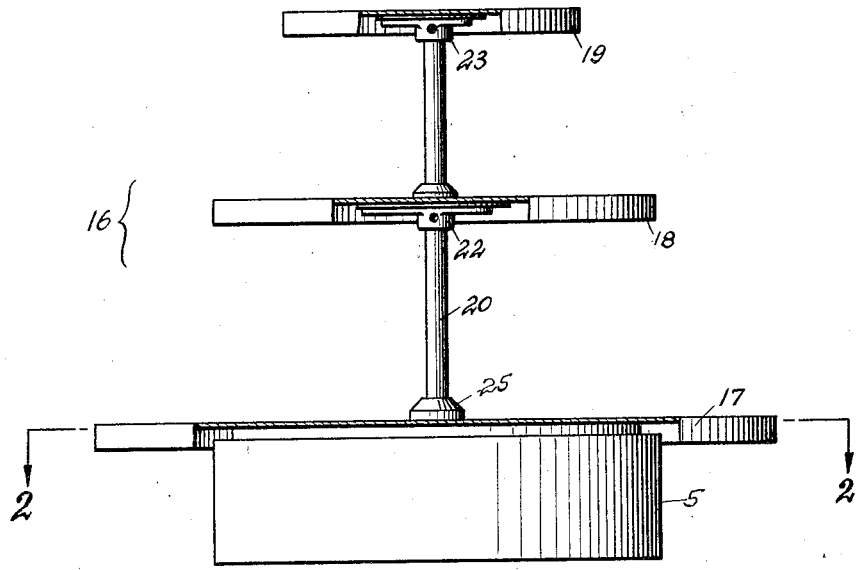
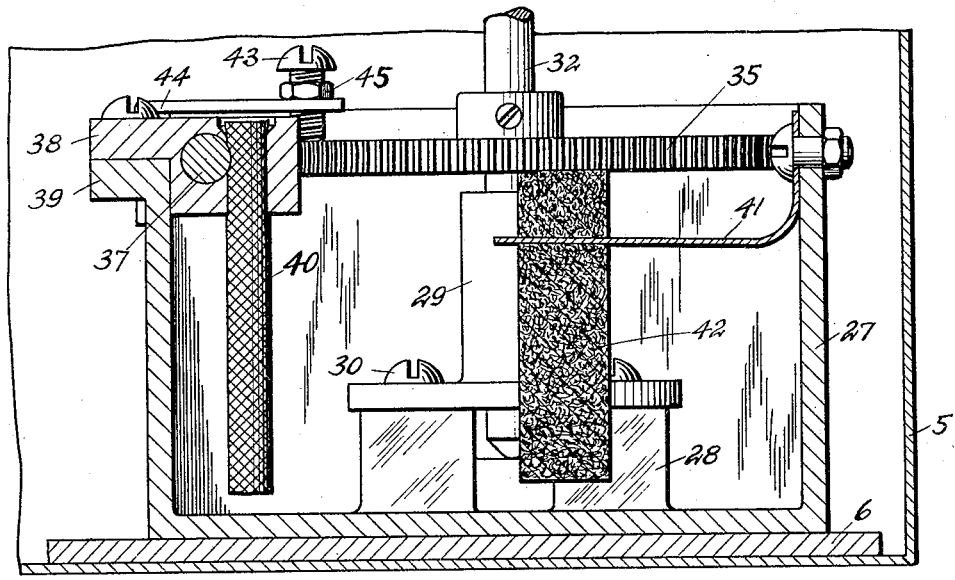
WITNESSES:                                INVENTOR:
                                        Nathan Krawitz,
                                        BY
                                            ATTORNEY.

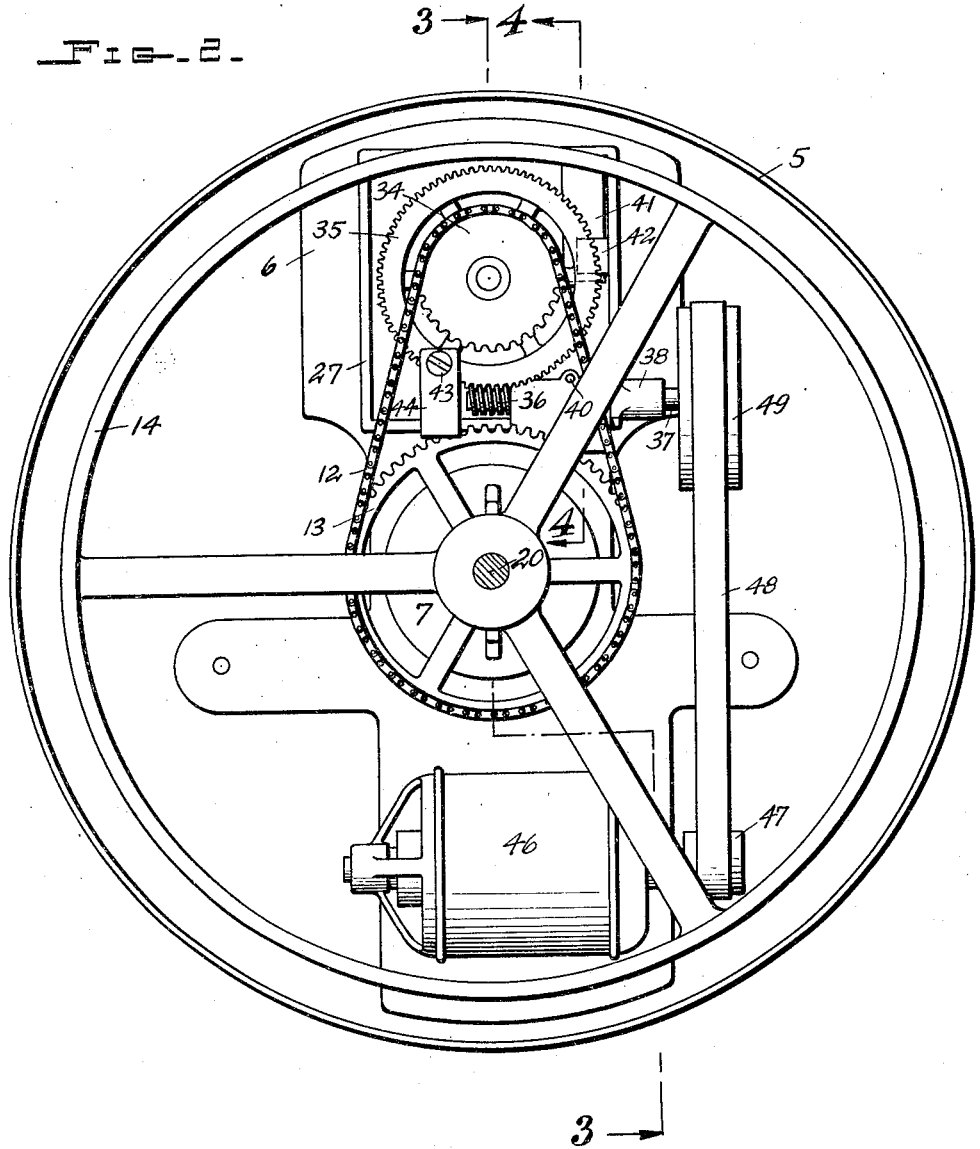

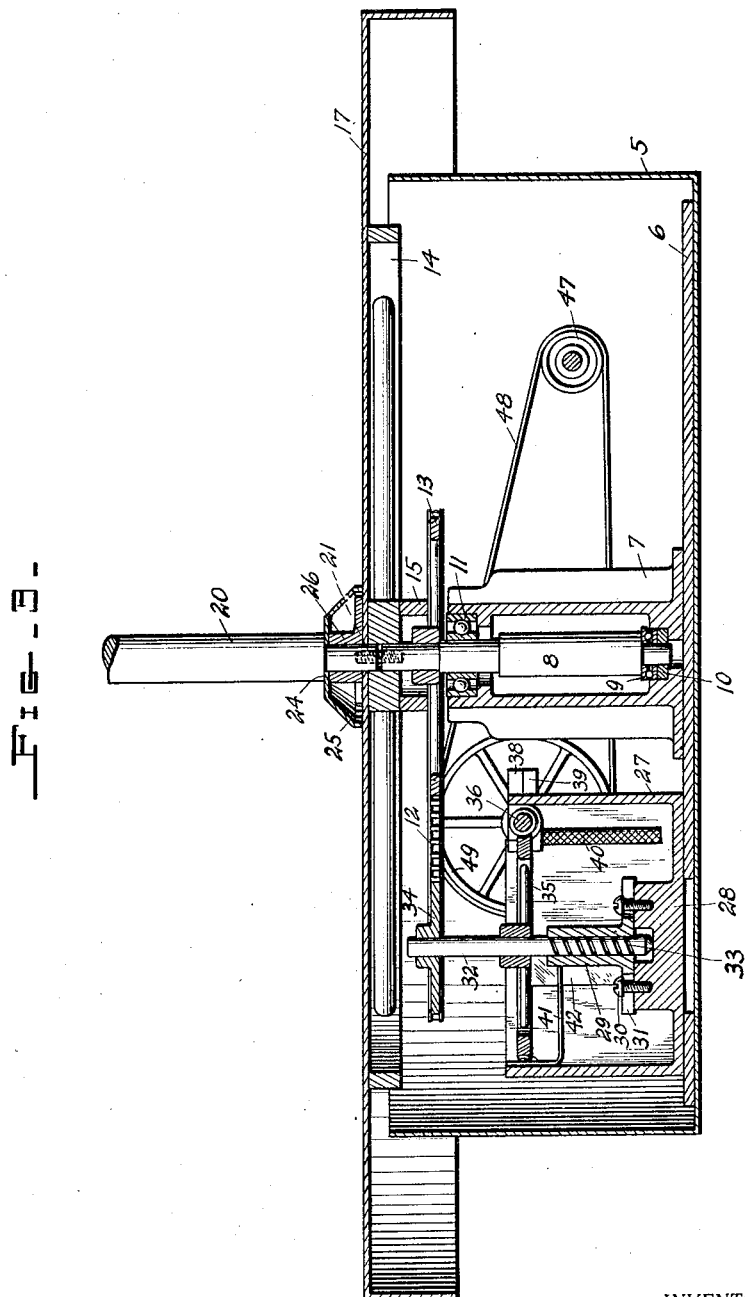

Patented July 5, 1932

1,865,923

UNITED STATES PATENT OFFICE

NATHAN KRAWITZ, OF PHILADELPHIA, PENNSYLVANIA

DISPLAY DEVICE

Application filed November 3, 1928. Serial No. 316,925.

This invention relates to display devices and more particularly to a device which is rotatable so that goods displayed thereon may be viewed from all sides.

The object of the invention is to provide a device of this character which will operate noiselessly over a long period of time without attention of any kind.

The invention resides in a display device having its mechanism preferably concealed in a casing which is disposed below a display stand consisting of one or more platforms. The device is so arranged that different numbers of platforms may be used by spacing them differently upon a vertical shaft or by substituting a shaft of a different length.

The stand is supported on a spindle mounted in a center bearing, preferably with anti-friction bearings, to take care of both lateral and vertical thrusts. A wheel or other rigid member is mounted on the upper end of the spindle for supporting the stand and stiffening the lower platform. A motor driven worm meshes with a worm gear on a shaft which is operatively connected to the spindle and vibration of the worm gear is prevented by an oil absorbing member which contacts with it under spring pressure, as illustrated in the accompanying drawings, in which Figure 1 is an elevation of a device constructed according to my invention, the flanges of the platforms being partly broken away, Figure 2 an enlarged plan view of the device with the stand removed, taken substantially on line 2—2 on Figure 1, Figure 3 a vertical section taken in the plane of the broken line 3—3 on Figure 2, the platform supporting shaft being broken away, and Figure 4 a fragmentary vertical section on line 4—4 on Figure 2, the view being drawn to a still larger scale and showing the means for lubricating the worm and worm gear and for preventing the worm gear from vibrating.

Referring now more in detail to the drawings, the device is shown provided with a casing 5 containing a base 6 which supports a center bearing 7 having a spindle 8 whose lower end is preferably supported by an anti-friction bearing 9 and provided with a reduced part which extends into a bearing washer 10 for holding it against lateral movement. An anti-friction bearing 11 is mounted in the top of the center bearing and holds the spindle against the lateral thrusts exerted by a chain 12 which engages a sprocket 13 fixed to the spindle adjacent bearing 11.

A wheel 14, mounted on the upper end of the spindle and spaced from the sprocket by a separator 15, supports a display stand 16 which is shown as having a lower platform 17, an intermediate platform 18 and an upper platform 19, all supported on a center shaft 20 whose lower end is connected to the spindle, as by means of the stud 21. The central part of the lower platform is supported on the hub of wheel 14 whose rim supports it intermediate its center and periphery so that it may support heavy loads.

Platforms 18 and 19 are supported on three-armed collars 22 and 23, respectively, which are fixed to the center shaft by set screws. The lower end of shaft 20 is reduced in diameter to form a shoulder 24 which forces the edge of an ornament 25 against a three-armed collar 26 which, in turn, forces platform 17 against wheel 14 when the center shaft is rotated to tighten stud 21.

The spaces between the several platforms may be adjusted by moving collar 22 on the shaft, platforms added or removed, a center shaft of a different length substituted, or the center shaft and upper platforms omitted entirely and the lower platform fixed in place with a short stud threaded into the top of the spindle.

An oil box 27 is mounted on one end of the base and provided with a step bearing 28 at its center, to which a bearing 29 is adjustably secured by screws 30 which extend through slots 31 and are threaded into the step bearing. A shaft 32, rotatably mounted in bearing 29 and having its lower end pointed or rounded, rests upon step bearing 28 and is provided with a spiral groove 33 for feeding oil upwardly into bearing 29 when the shaft is rotated. A sprocket 34, fixed to the upper end of shaft 32, is engaged by chain 12 and a worm gear 35, fixed to the shaft below the sprocket, meshes with a worm 36 whose shaft 37 is rotatably mounted in a bearing 38 secured to a flange 39 formed on the oil box. A wick 40 extends through bearing 38 in contact with shaft 37 and depends into the oil box for drawing oil therefrom and lubricating the shaft.

A spring 41 is secured to the side of the oil box and supports an absorbent member 42, which may be a piece of block felt, in engagement with the rim of the worm gear under sufficient tension to absorb any vibration which may be imparted to it. The end of a screw 43, which is threaded through a clip 44 secured to the oil box, lightly touches or barely misses the rim of gear 35 and is held in this position by a lock nut 45 to prevent the gear from tilting in case the stand should be greatly overloaded.

A motor 46, mounted upon the other end of the base, has its pulley 47 connected by a belt 48 to a pulley 49 fixed on the outer end of shaft 37 so that, when the motor is energized, worm 36 will be rotated and impart rotation to worm gear 35 and shaft 32, thus imparting rotation to the display stand. The oil box is partly filled with oil which is drawn upwardly through wick 40, for lubricating the worm bearing, and through absorbent member 42 for lubricating the teeth of the worm gear.

As spring 41 causes the absorbent member to exert considerable pressure against the worm gear, any vibration imparted to the worm gear by the motor will be absorbed by it. Packing is preferably placed between the motor and the base and between the lower plate and wheel 14 so that the device may operate with practically no noise. If the anti-friction bearings are properly packed with grease and the oil box partly filled with oil, the device will operate for exceptionally long periods without any attention whatever.

While I have described my invention as taking a particular form, it will be understood that modifications may be made without departing from the spirit thereof, and hence I do not limit myself to the precise construction set forth, but consider that I am at liberty to make such changes and alterations as fairly come within the scope of the appended claims.

I claim:—

1. A display device comprising a housing, a wheel journaled with its perimeter horizontally within and vertically above the margin of the housing, a table upon the wheel extending radially beyond the wheel and housing, and means within the housing to rotate the wheel.

2. A display device comprising a housing circular in plan, a wheel vertically journaled concentrically with its perimeter horizontally within and vertically above the margin of the housing, a table upon the wheel and extending radially beyond the wheel and housing, and means within the housing to rotate the wheel.

3. A display device comprising a housing, a wheel journaled with its perimeter horizontally within and vertically above the margin of the housing, a table upon the wheel extending radially beyond the wheel and housing, a flange about the perimeter of the table obscuring the interval between the table and the edge of the housing, and means within the housing to rotate the wheel.

4. A display device comprising a housing circular in plan, a wheel vertically journaled concentrically with its perimeter horizontally within and vertically above the margin of the housing, a table upon the wheel extending radially beyond the wheel and housing, a flange about the perimeter of the table obscuring the interval between the table and the edge of the housing, and means within the housing to rotate the wheel.

In testimony whereof I have signed my name to this specification.

NATHAN KRAWITZ.